United States Patent [19]
Iri et al.

[11] Patent Number: 4,737,011
[45] Date of Patent: Apr. 12, 1988

[54] CONNECTOR FOR HIGH ENERGY BEAM

[75] Inventors: Eiji Iri, Kawanishi; Takeshi Satake, Minoo, both of Japan

[73] Assignee: Dainichi-Nippon Cables Ltd., Hyogo, Japan

[21] Appl. No.: 753,969

[22] Filed: Jul. 11, 1985

[30] Foreign Application Priority Data

Jul. 13, 1984 [JP] Japan .............................. 59-106830[U]
Jul. 31, 1984 [JP] Japan .............................. 59-118972[U]
Feb. 21, 1985 [JP] Japan .............................. 60-24330[U]

[51] Int. Cl.⁴ .............................................. G02B 6/36
[52] U.S. Cl. .............................. 350/96.20; 350/96.34
[58] Field of Search ............... 350/96.20, 96.21, 96.22, 350/96.34; 423/290, 297, 301, 304, 305, 306, 326, 327, 328, 331, 332, 406, 409, 411, 412, 439, 440, 446, 583, 598, 600, 606, 607, 608, 635

[56] References Cited

U.S. PATENT DOCUMENTS

| | | | |
|---|---|---|---|
| 4,361,380 | 11/1982 | Marazzi | 350/96.21 |
| 4,371,233 | 2/1983 | Masuda | 350/96.21 X |
| 4,487,474 | 12/1984 | Nishie et al. | 350/96.21 |
| 4,537,193 | 8/1985 | Tanner | 128/303.1 |
| 4,575,181 | 3/1986 | Ishikawa | 350/96.20 |

FOREIGN PATENT DOCUMENTS

| | | |
|---|---|---|
| 0157593 | 10/1985 | European Pat. Off. |
| 56-51707 | 9/1981 | Japan |
| 56-135811 | 10/1981 | Japan |
| 59-20146 | 2/1984 | Japan |
| 2042210 | 9/1980 | United Kingdom |
| 2076993 | 12/1981 | United Kingdom |

OTHER PUBLICATIONS

Suzuki et al., "Ceramic Capillary Connector for 1.3 μm Single-Mode Fibres," *Electr. Lett.*, vol. 15, No. 25, Dec. 1979, pp. 809-810.

Mossman, "Ceramic Components for Optical-Fibre Systems," *Electr. Lett.*, vol. 17, No. 13, Jun. 1981, pp. 451-452.

R. C. Weast "Handbook of Chemistry and Physics", 52nd edition, 1971-1972, pp. D-51-D53, The Chemical Rubber Co.

*Primary Examiner*—John Lee
*Attorney, Agent, or Firm*—Burns, Doane, Swecker & Mathis

[57] ABSTRACT

A connector for a high energy beam, which is provided with a sleeve fitted on an optical fiber and having an optical fiber support portion of an inner diameter about equal to a diameter of the optical fiber and a larger diameter portion positioned ahead of the optical fiber support portion and having an inner diameter larger than the diameter of the optical fiber so as to form a gap around the optical fiber and in a proper length from the end face of the optical fiber. The optical fiber support portion is formed of a heat resistant inorganic substance having a melting point of 1500° C. or more, for example, a transparent substance, such as sapphire, or an opaque substance, such as aluminium oxide; the so-called fine ceramics. The connector of the present invention is free from burning, melting and diffusion of metallic material, and breakage of optical fiber when in use, thereby being easy to handle and high in quality and reliability and having a long life time.

28 Claims, 5 Drawing Sheets

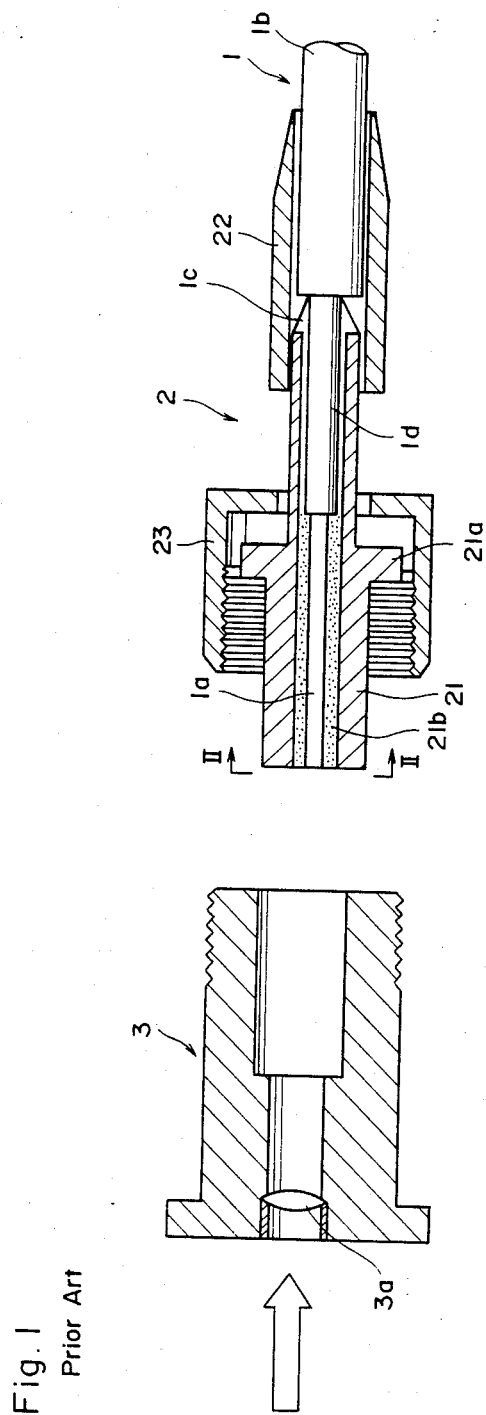
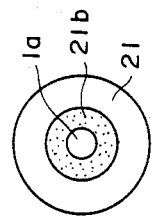
Fig. 1 Prior Art
Fig. 2 Prior Art

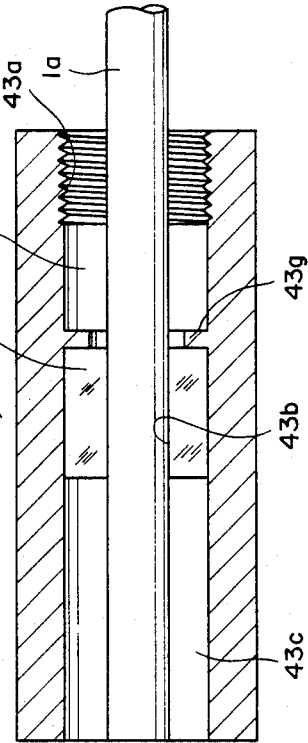
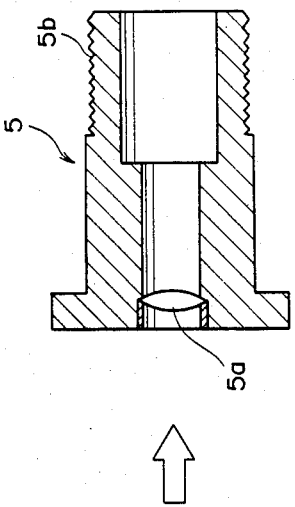
Fig. 5
Fig. 6

CONNECTOR FOR HIGH ENERGY BEAM

BACKGROUND OF THE INVENTION

1. Field of the Invention

This invention relates to a connector mounted on an end of optical fiber for transmitting a high energy beam, such as the laser beam, used for industries such as welding and soldering and for medical treatment such as cutting out affected parts.

2. Description of the Prior Art

Generally, on the incident and outgoing ends of an optical fiber used for transmitting this kind of high energy laser beam are mounted connector plugs so that the plugs are adapted to connect with receptacles one of which is at the incident end and contains a lens attached to a laser system and the other of which is at the outgoing end and contains a lens opposite to the object to be processed.

Such a plug of the conventional connector for a high energy beam is constructed as described below. FIG. 1 is a sectional view exemplary of a plug at the incident end side of the conventional connector for the high energy beam and FIG. 2 is a front view exemplary of the plug when viewed on the line II—II in the direction of the arrow in FIG. 1. Reference numeral 1 designates a cord containing therein a single optical fiber 1a, 2 designates a plug, and 3 designates a receptacle containing therein a lens 3a.

The cord 1 is cut out at sheath 1b of polyvinylchloride (P.V.C.), a Kevlar (trade mark of Dupont) 1c, and a jacket 1d of nylon to expose the Kevlar 1c, jacket 1d and an optical fiber 1a in a desired length, so that a plug body 21 is sleeved across an axially intermediate portion of the bared optical fiber 1a and the root portion of the bared jacket 1d.

The plug body 21 is made from stainless steel, formed in a cylindrical shape, provided at the outer periphery of an axially intermediate portion with a flange 21a, sleeved across the bared optical fiber 1a and jacket 1d, and fixed concentrically and integrally to the optical fiber 1a and jacket 1d through epoxy resin 21b filled between the inner periphery of body 21 and the outer periphery of optical fiber 1a. The bared Kevlar 1c covers the outer periphery of the root portion of plug body 21, and a skirt member 22 of stainless steel is sleeved on the sheath 1b and the root portion of plug body 21 so that the Kevlar 1c is sandwiched between the skirt member 22 and the outer periphery of the plug body 21 and fixed integrally thereto through a binder. In addition, reference numeral 23 designates a cap nut, which is screwably tightened to the outer periphery of the receptacle 3 in condition of inserting therein the utmost end portion of plug body 21, thereby insertably holding the plug body 21 to the receptacle 3.

As shown in FIG. 2, such a conventional optical fiber connector exposes at the utmost end face of plug 2 the epoxy resin 21b which concentrically integrally fixes the optical fiber 1a and plug body 21. Hence, when in the laser system lens 3a and optical fiber 1a are insufficiently aligned, the laser beam shifts from the incident end face of the optical fiber 1a so as to be projected on the epoxy resin 21b, whereby the epoxy resin 21b may burn to cause an escape or damage of the plug.

As a countermeasure for the above, an optical connector for a high energy beam has already been disclosed in the Japanese Utility Model Application No. 59-20146 (1984) by the inventors of the present invention. The optical connector disclosed therein is constructed so that the plug body 21 is divided into a holder and a sleeve. Combustibles are thereby eliminated from the vicinity of the laser beam incident end face of the sleeve supporting the fore end of optical fiber, so that even when the incident laser beam shifts, damage to the plug can be prevented.

FIG. 3 is a partially cutaway side view of the connector disclosed in the above described application and FIG. 4 is a schematic front view of the connector when viewed on the line IV—IV in the direction of the arrow in FIG. 3, in which reference numeral 31 designates a skirt member, 32 designates a holder, 33 designates a sleeve, and 34 designates a cap nut.

The sleeve 33 is cylindrical, made from copper, has at an axially intermediate portion an optical fiber support portion 33a of an inner diameter about equal to a diameter of the optical fiber 1a, has both axial end portions having a somewhat larger inner diameter than the optical fiber support portion 33a, and screws at a screw thread 33b formed at the inner periphery of the root portion with an utmost end of the holder 32 so that the sleeve 33 is connected thereto. The optical fiber 1a is held by the skirt member 31, holder 32, and optical fiber support portion 33a at the intermediate portion of sleeve 33, and is level at the utmost end face with the front end face of sleeve 33. In this construction, an annular gap 33c having a desired axial length from the end of optical fiber 1a, is formed between the sleeve 33 and the optical fiber 1a. Accordingly, even when the laser beam is incident shifting from the end face of optical fiber 1a, since there are no combustibles around the optical fiber 1a, the inconvenience of burning the connector can be prevented.

However, the optical connector having the construction described above allows the laser beam shifting from the end face of optical fiber 1a to be incident through the aforesaid gap 33c on the outer periphery of optical fiber 1a or the inner periphery of the larger diameter portion at the fore end of sleeve 33. When the laser beam is incident on the outer periphery of optical fiber 1a, some fusion is created on same, but leads to less breakage. However, when the laser beam is incident on the inner periphery of sleeve 33, the copper material for the sleeve 33 is molten and scattered to strike the outer periphery of optical fiber 1a, thereby creating a problem in that the optical fiber 1a may be cracked on the outer periphery rendering it breakable.

OBJECTS OF THE INVENTION

In the light of the above circumstances, this invention has been designed.

A first object of the invention is to provide a connector for a high energy beam of high quality and high reliability which is free from breakage when in use.

A second object of the invention is to provide a connector for a high energy beam, which eliminates organic substances from around the laser beam incident portion so as to reduce the potential of burning.

A third object of the invention is to provide a connector for a high energy beam, which has no potential of melting and scattering metallic material at the laser beam incident portion.

A fourth object of the invention is to provide a connector for a high energy beam, which has no fear for breaking the optical fiber at a junction between a plug and a receptacle.

A fifth object of the invention is to provide a connector for a high energy beam, which provides easy adjustment of the incident angle of the beam when the plug is coupled with the receptacle.

A sixth object of the invention is to provide a connector for a high energy beam, which can be small-sized and lightweight as a whole.

A seventh object of the invention is to provide a connector for a high energy beam, which uses a transparent member or a translucent member, processed having a roughened surface to absorb or diffuse the laser beam shifting from the end face of optical fiber, thereby avoiding burning or breakage of the connector.

An eighth object of the invention is to provide a connector for a high energy beam, which allows the laser beam shifting from the end face of the optical fiber to reflect in the direction of moving away from the periphery of the optical fiber, thereby avoiding breakage of the optical fiber.

The above and further objects and features of the invention will more fully be apparent from the following detailed description with reference to accompanying drawings.

BRIEF DESCRIPTION OF THE DRAWINGS

FIG. 1 is a partially cutaway structural side view of the conventional optical connector, FIG. 2 is a front view of the connector when viewed on the line II—II in FIG. 1, FIG. 5 is a partially cutaway structural side view of a first embodiment of a connector for high energy beam of the invention.

FIG. 6 is a sectional side view of a sleeve at the first embodiment of the invention in FIG. 5, and FIGS. 7 through 12 are sectional structural side views of sleeves at second through seventh embodiments of the invention.

DETAILED DESCRIPTION OF THE INVENTION

Figure 4:
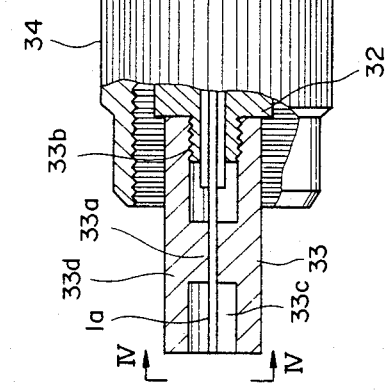
FIG. 4 is a front view of the connector when viewed on the line IV—IV in FIG. 3.
Figure 4:
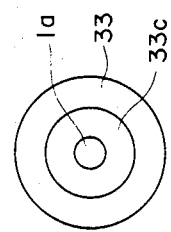

Next, embodiments of a connector for a high energy beam of the invention will be concretely described in accordance with the drawings.

Referring to FIGS. 5 and 6, reference numeral 1 designates a cord containing therein a single core optical fiber 1a, 2 designates a plug, and 5 designates a receptacle.

The cord 1 is cut out at sheath 1b of polyvinylchloride (P.V.C.), Kevlar 1c and jacket 1d of nylon, so that the jacket 1d, Kevlar 1c and optical fiber 1a are bared each in a desired length. A holder 41 is fixedly sleeved across an axially intermediate portion of the bared portion of optical fiber 1a and the root portion of the bared portion of jacket 1d, a skirt member 42 is fixed across the root portion of holder 41 and the outer periphery of the utmost end of sheath 1b, a sleeve 43 is fixed across the utmost end of the bared portion of optical fiber 1a and the utmost end of holder 41, and cap nut 44 is axially movably sleeved across the holder 41, skirt member 42 and sleeve 43.

The holder 41 is made from brass, formed in a cylinder whose inner diameter is slightly larger than the diameter of jacket 1d, reduced in outer diameter at the root portion to form a shoulder 41b, provided at the outer periphery near the utmost end with a larger diameter flange 41a and at the outer periphery ahead of the flange 41a with a screw thread 41c. Also, holder 41 is sleeved across near the root portion of the bared portion of jacket 1d and an intermediate portion of the bared portion of optical fiber 1a and covered at the outer periphery of the smaller outer diameter portion of the root portion with the bared Kevlar 1c.

Between the inner periphery of the holder 41 and the outer periphery of the optical fiber 1a is interposed a metallic sleeve 41d abutting at the root portion against the utmost end of jacket 1d and somewhat projecting at the utmost end from the fore end of holder 41. Epoxy series binders 41e and 41f are filled between the metallic sleeve 41d and the inner periphery of holder 41, and the metallic sleeve 41d and the outer periphery of optical fiber 1a, the holder 41 being concentrically and integrally bonded with optical fiber 1a through the binders 41e and 41f and metallic sleeve 41d.

The skirt member 42 is made from brass the same as the holder 41, formed in a cylindrical shape of an inner diameter of the portion other than the fore end, slightly larger than the outer diameter of the reduced diameter portion at the root portion of holder 41, and sleeved across the outer periphery of the fore end of sheath 1b and that of the root portion of holder 41 covered by Kevlar 1c. The outer periphery of the root portion of holder 41 is covered by the Kevlar 1c, the inner periphery thereof, as well as the inner periphery of the fore end of skirt member 42, are coated with a binder, so that the fore end portion of skirt member 42 and the root portion of holder 41 sandwich therebetween the Kevlar 1c, with the three members being fixed integrally with each other by the binder.

The sleeve 43 is cylindrical, has at an axially intermediate portion an optical fiber support portion 43f of an inner diameter equal to or slightly larger than the diameter of optical fiber 1a, formed at both axial sides of support portion 43f to have a somewhat larger inner diameter than the optical fiber support portion 43f so as to form gaps 43c and 43d between the inner peripheries of sleeve 43 and the outer periphery of optical fiber 1a, and provided at the inner periphery of the root portion with a screw thread 43a. The screw thread 43a is coated with a binder and screws with the screw thread 41c at the fore end of holder 41, thereby connecting the sleeve 43 concentrically and integrally with the fore end of holder 41 in a condition of being sleeved on optical fiber 1a.

In addition, in this embodiment, the sleeve 43, as enlarged in FIG. 6, is formed at the optical fiber support portion 43f of only high heat resistant inorganic material and press-fitted into the depth of gap 43c. The remaining portions are made from copper as in the conventional connector shown in FIG. 3. In FIG. 6, reference numeral 43g designates a positioning stopper for the optical fiber support portion 43f when fitted into the sleeve 43.

TABLE 1

| Substance | Chemical Formula | Refractive Index | Melting Point (°C.) |
|---|---|---|---|
| Sapphire | $Al_2O_3$ | 1.76 | 2030 |
| Rutile | $TiO_2$ | 2.4 | 1825 |
| Strontium Titanate | $SrTiO_3$ | 2.2 | 2080 |
| Diamond | $\beta$-C | 2.4 | 3973 |

TABLE 2

| | Substances | Chemical Formula | Melting Point (°C.) |
|---|---|---|---|
| Oxide | Aluminum Oxide | $Al_2O_3$ | 2050 |
| | Barium Oxide | $BaO$ | 1923 |
| | Beryllium Oxide | $BeO$ | 2530 |
| | Calcium Oxide | $CaO$ | 2570 |
| | Cerium Oxide | $CeO_2$ | 2600 |
| | Chromium Oxide | $Cr_2O_3$ | 2435 |
| | Cobalt Oxide | $CoO$ | 1800 |
| | Columbium Oxide | $Cb_2O_5$ | 1520 |
| | Gallium Oxide | $Ga_2O_3$ | 1740 |
| | Hafnium Oxide | $HfO_2$ | 2810 |
| | Lanthanum Oxide | $La_2O_3$ | 2320 |
| | Lithium Oxide | $LiO_2$ | 1700 |
| | Thorium Oxide | $ThO_2$ | 3300 |
| | Titanium Oxide | $TiO_2$ | 1840 |
| | Uranium Oxide | $UO_2$ | 2878 |
| | Zirconium Oxide | $ZrO_2.CaO.HfO_2$ | 2677 |
| | Tantalum Oxide | $Ta_2O_5$ | 1875 |
| | Vanadium Oxide | $V_2O_5$ | 1970 |
| | Tin Oxide | $SnO_2$ | 1825 |
| Silicate | Barium Silicate | $BaO.SiO_2$ | 1605 |
| | Barium Zirconium Silicate | $BaO.ZrO_2.SiO_2$ | 1573 |
| | Beryllium Silicate | $2BeO.SiO_2$ | 2000 |
| | Lime Silicate | $2CaO.SiO_2$ | 2130 |
| | Lime Aluminum Silicate | $2CaO.Al_2O_3.SiO_2$ | 1590 |
| | Magnesium Silicate | $2MgO.SiO_2$ | 1890 |
| | Zinc Zirconium Silicate | $ZnO.ZrO_2.SiO_2$ | 2078 |
| | Zirconium Silicate | $ZrO_2.SiO_2$ | 2500 |
| | Aluminum Silicate | $Al_2O_3.SiO_2$ | 1830 |
| | Magnesium Silicate | $MgO.SiO_2$ | 1890 |
| | Zirconium Silicate | $ZrO_2.SiO_2$ | 2500 |
| | Barium Aluminum Silicate | $BaO.Al_2O_3.SiO_2$ | 1750 |
| Aluminate | Lime Aluminate | $3CaO.5Al_2O_3$ | 1720 |
| | Lithium Aluminate | $Li_2O.Al_2O_3$ | 1625 |
| | Soda Aluminate | $Na_2O.Al_2O_3$ | 1650 |
| | Titanium Aluminate | $TiO_2.Al_2O_3$ | 1860 |
| | Lime Soda Aluminate | $3CaO.2Na_2O.5Al_2O_3$ | 1630 |
| | Titanium Aluminate | $TiO_2.Al_2O_3$ | 1860 |
| | Lime Aluminate | $CaO.Al_2O_3$ | 1720 |
| Titanate | Beryllium Titanate | $3BeO.TiO_2$ | 1810 |
| | Lime Titanate | $CaO.TiO_2$ | 1980 |
| | Magnesium Titanate | $2MgO.TiO_2$ | 1830 |
| Nitride | Barium Nitride | $Ba_3N_2$ | 2200 |
| | Boron Nitride | $BN$ | 2730 |
| | Hafnium Nitride | $HfN$ | 3300 |
| | Tantalum Nitride | $TaN$ | 3360 |
| | Titanium Nitride | $TiN$ | 2900 |
| | Aluminum Nitride | $AlN$ | 2450 |
| | Silicon Nitride | $Si_3N_4$ | 1900 |
| Boride | Nitrogen Boride | $NB$ | 3000 |
| | Hafnium Boride | $HfB$ | 3065 |
| Carbide | Columbium Carbide | $CbC$ | 3500 |
| | Hafnium Carbide | $HfC$ | 4160 |
| | Tantalum Carbide | $TaC$ | 3880 |
| | Silicon Carbide | $SiC$ | 2600 |
| Zirconate | Thorium Zirconate | $ThO_2.ZrO_2$ | 2800 |
| | Barium Zirconate | $BaO.ZrO_2$ | 2620 |
| | Calcium Zirconate | $CaO.ZrO_2$ | 2350 |
| | Magnesium Zirconate | $MgO.ZrO_2$ | 2150 |
| Phosphate | Aluminum Phosphate | $AlPO_4$ | 1500 |
| | Calcium Phosphate | $Ca_3(PO_4)_2$ | 1670 |
| | Fluorine Calcium Phosphate | $CaF_2.3CaP_2O_8$ | 1630 |
| | Silicon Calcium Phosphate | $5CaO.SiO_2.P_2O_5$ | 1760 |
| Spinel | Barium Aluminate | $BaO.Al_2O_3$ | 2000 |
| | Calcium Aluminate | $CaO.Al_2O_3$ | 1600 |
| | Magnesium Aluminate | $MgO.Al_2O_3$ | 2135 |
| | Zinc Aluminate | $ZnO.Al_2O_3$ | 1950 |
| | Magnesium Chromate | $MgO.Cr_2O_3$ | 1780 |
| | Zinc Ferrate | $ZnO.Fe_2O_3$ | 1590 |

TABLE 2-continued

| Substances | Chemical Formula | Melting Point (°C.) |
|---|---|---|
| Magnesium Aluminate | $Al_2O_3.MgO$ | 2135 |

The optical fiber support portion 43f at sleeve 43 employs a transparent or a translucent heat resistant inorganic substance having a melting point of 1500° C. or more and of a refractive index higher than that of clad of optical fiber 1a, for example, 1450° C., as shown in Table 1, or alternatively an opaque or translucent and amorphous heat resistant inorganic substance having a melting point of 1500° C. or more, the so-called fine ceramics, as shown in Table 2.

A typical transparent or translucent material shown in Table 1 is sapphire. The sapphire material, when in use, has a melting point of 2030° C. and refractive index of 1.76 regardless of being natural or synthetic and satisfies the above requirement. The connector using sapphire of the present invention was mounted on a quartz series optical fiber having a core diameter of 400 μm and a clad diameter of 500 μm and was applied with pulse of 20 J, 8 m sec and 5 pps for one minute in condition of delaying an incident axis by 30′ (minutes). No trouble was found. However, even with the same conditions as the above, the use of molten quartz having a melting point of 1710° C. and a refractive index of 1.45 was found to heat the connector, and silver chloride having a refractive index of 1.9 and a melting point at 457° C. was vaporized.

The opaque or translucent amorphous materials shown members of Table 2 are in a group of materials, so-called fine ceramics, to which $Al_2O_3$ (aluminum oxide) is typical. The amorphous substance $Al_2O_3$ has a melting point of 2050° C. The connectors of the invention using $Al_2O_3$ were mounted on both ends of a pure quartz optical fiber having a core diameter of 400 μm and clad diameter of 500 μm, and the laser beam of 100 watt and CWYAG was incident on the connectors for one minute in a condition of shifting by angle of 6°. No trouble was found. However under the same condition as above, when connectors of fine ceramics such as tungsten oxide having a melting point of 1470° C. was used, the ceramic portion was vaporized.

Incidentally, the transparent or translucent substances shown in Table 1 need only transmit 5% or more of the quantity of the incident light in a transmission distance of 1 mm. On the contrary, the opaque or translucent substances in Table 2 transmit only less than 5% of the quantity of the incident light in the transmission distance of 1 mm.

Also, with respect to the substances shown in Tables 1 and 2 it is preferable to have a coefficient of thermal expansion as close to glass as possible. The reason for this is that the optical fiber support portion 43f thermally expands to press hard on the optical fiber 1a and give it stress, whereby microbending loss (deterioration in the light transmission efficiency by the stress applied to the optical fiber) is created. When microbends are repeated, the optical fiber may be damaged.

The optical fiber 1a is 150 to 1250 μm in diameter, projects from the utmost end of metallic sleeve 41d into the sleeve 43, passes through a bore 43b provided at the inside of the optical fiber support portion 43f of sleeve 43, has a diameter of about equal to that of the optical fiber and is positioned at the end at the incident side concentrically with the sleeve 43 and to be level with the utmost end face thereof. The gaps 43c and 43d formed between the root portion of sleeve 43 and the inner periphery thereof and the outer periphery of optical fiber 1a, contain only air. No combustible. Such as an organic material, exists in the gaps 43c and 43d.

The reason for keeping the end face of optical fiber 1a level with the utmost end face of sleeve 43 is that when the optical fiber 1a projects at its end face from the utmost end face of sleeve 43, there is a fear of breaking the optical fiber 1a, and when the end face thereof is recessed, it is difficult to clean same. Hence, the end face of optical fiber 1a need not be level with the utmost end face of sleeve 43.

The cap nut 44 is made of stainless steel or brass and is provided at the inner periphery of the fore end portion with a screw thread 44a tightly screwable with a screw thread 5b formed at the outer periphery of receptacle 5 at the laser beam outgoing side and at the inner periphery near the rear end with an inner flange 44b of an inner diameter smaller than the diameter of the flange 41a at holder 41. A coil spring 45 is interposed between inner flange 44b and flange 41a at holder 41 and biases cap nut 44 to move away from the receptacle 5.

Figure 3:
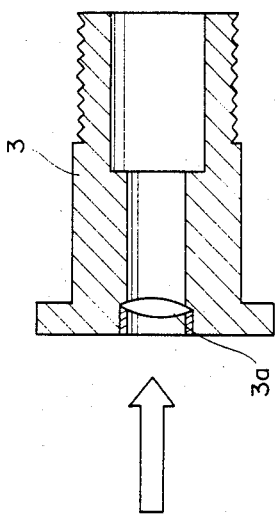
FIG. 3 is a partially cutaway structural side view of the conventional optical connector having a sleeve.

The receptacle 5 is made cylindrical in the same manner as the conventional receptacle shown in FIGS. 1 and 3 and contains a lens 5a fixed to face the laser beam outlet at a laser system (not shown).

In the connector for a high energy beam of the present invention constructed according to the foregoing, the laser beam output from the laser system (not shown) is incident on the lens 5a (shown by the unshaded arrow in FIG. 5) so as to be converged and thereafter is incident on the end face of optical fiber 1a to thereby be propagated therein. In this case, even when the laser beam is incident on a position out of the end face of optical fiber 1a, the gap 43c therearound contains only air. Air, of course does not burn. Also, even when the laser beam is incident on the inner periphery of the fore end portion of sleeve 43, the inner periphery is high in heat resistance so as to not be molten or vaporized.

In a case where the optical fiber support portion 43f uses a transparent or translucent material such as sapphire as, shown in Table 1, the laser beam incident on the optical fiber support portion 43f transmits the optical fiber support portion 43f while being attenuated, is reflected by the stopper 43g made of metal with only a small portion of the laser beam traveling toward rear gap 43d, thereby not heating the optical fiber 1a to a high temperature at rear gap 43d. Also, the laser beam incident on the optical fiber support portion 43f has difficulty in entering optical fiber 1a because the sapphire constituting the optical fiber support portion 43f has the refractive index higher than that of the clad of optical fiber 1a. Furthermore, the laser beam incident on the clad at the utmost end of optical fiber 1a, or entering from the core to the clad, easily enters the optical fiber support portion 43f which is higher in refractive index than the clad so that no laser beam transmits the clad of optical fiber 1a to the rear gap 43d, thereby restricting a temperature rise thereof.

The connector for a high energy beam of the present invention constructed as shown in FIG. 5 and using sapphire having a refractive index of 1.76, was mounted on the incident end of a step index type quartz series optical fiber having a core diameter of 400 μm and a clad diameter of 500 μm and radiated by several tens of thousand pulses with the YAG laser beam having a pulse width of 8 m sec and output of 20 J. As a result, there was no breakage fault in the optical fiber. Also, even when the incident axis was shifted at an angle of 14° to 15°, the connector of the present invention was not broken. Incidentally, the conventional connector shown in FIG. 1 was at once rendered unusable, and that shown in FIG. 3, when shifted by at an angle of 20 to 30', lead to a breakage of optical fiber.

Figure 7:
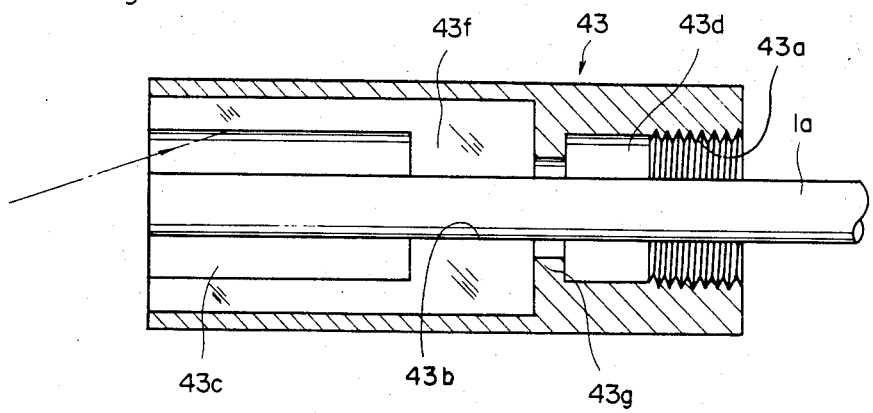
Figure 8:
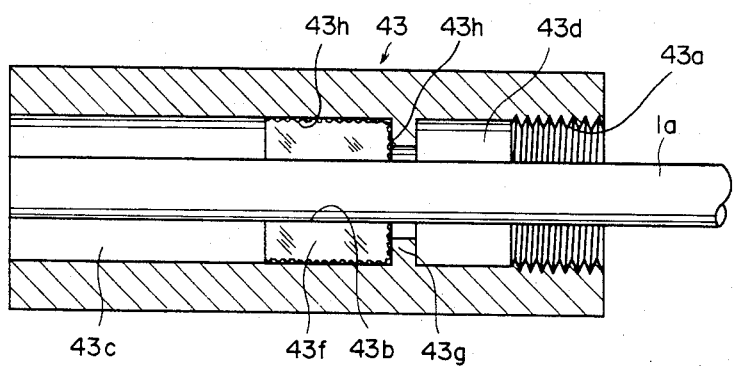

FIGS. 7 and 8 are sectional side views of sleeves 43 in a second and third embodiments of the invention.

In the second embodiment in FIG. 7, the optical fiber support portion 43f of sleeve 43 and the inner peripheral portion thereof facing gap 43c at the fore end side of optical fiber 1a are formed of a heat resistant inorganic substance as shown in Tables 1 and 2, other portions of sleeve 43 being made from copper in the same manner as the first embodiment. The above portion of heat resistant inorganic substance is press-fitted into the copper-made portion and positioned by a stopper 43g provided at the sleeve 43 in the same manner as the first embodiment.

In the third embodiment in FIG. 8, only the optical fiber support portion 43f is formed of a transparent or translucent heat resistant inorganic substance such as sapphire, and subjected to roughened surface processing at the outer periphery and end surface in contact with the inner periphery of the copper portion of sleeve 43 and with the stopper 43g, thereby forming diffusing surfaces respectively.

Below, an explanation will be given of the particular effects of the second and third embodiments.

In the second embodiment as shown in FIG. 7, even when the laser beam is incident on the inner periphery facing the front gap 43c, the inner periphery is formed of the heat resistant inorganic substance, thereby creating no fusion on the inner periphery.

In the third embodiment as shown in FIG. 8, the laser beam intended to transmit the optical fiber support portion 43 toward holder 41, or transmit other copper-made portions, is irregularly reflected or diffused by the diffusion surfaces 43h to expect energy attenuation, whereby there is no fear of heating the optical fiber 1a and stopper 43g and so on at a high temperature.

Figure 9:
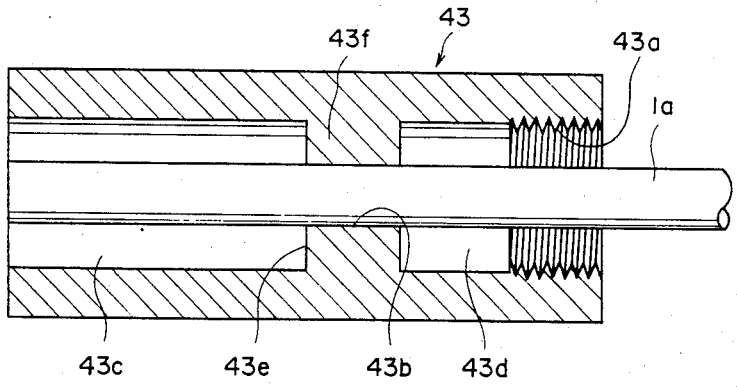

FIG. 9 is a sectional side view of a sleeve 43 in a fourth embodiment of the invention. In this embodiment, all of sleeve 43 is formed of the high heat-resistant inorganic substances shown in Tables 1 and 2 and other portions are the same in construction as the sleeve 43 in the first embodiment (refer to FIG. 5).

Incidentally, the sleeve 43 in this embodiment can be molded integrally by use of the opaque substance, especially $Al_2O_3$, $SiC$, $3Al_2O_3 \cdot 2SiO$, of the so-called fine ceramics, thereby enabling mass production at a low manufacturing cost.

Figure 10:
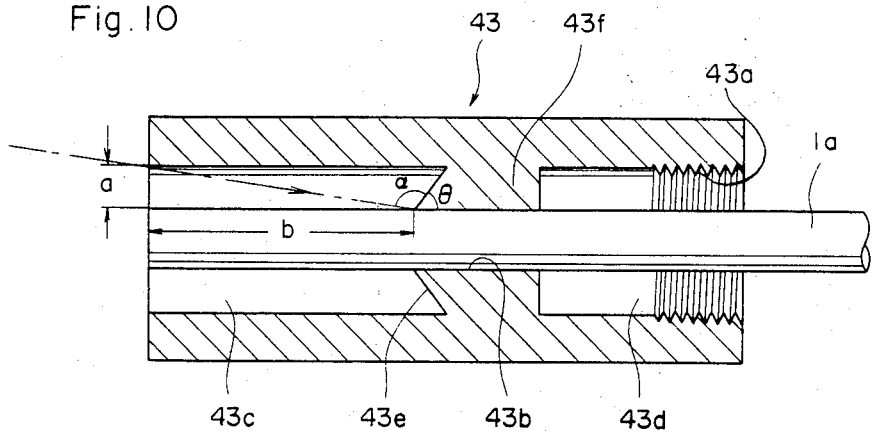

FIG. 10 is a sectional side view of a sleeve 43 in a fifth embodiment of the invention, which as a whole is formed integrally of the high heat-resistant inorganic substances shown in Tables 1 and 2 in the same manner as the fourth embodiment, but differs therefrom in that the fore end of the optical fiber support portion 43f, i.e., the end face 43e at the laser beam incident side, of sleeve 43 is tapered at an angle $\theta$ like a truncated cone whose diameter at the end side face of the optical fiber 1a is smallest, the angle $\theta$ of inclination being desirable to be set to satisfy the following equation:

$$\theta \leq 90° - \arctan(a/b),$$

wherein a is half of the difference between the inner diameter of the sleeve 43 and diameter of the optical fiber, and
  b is the distance between the fore end face of the sleeve 43 and the end face 43b of the optical fiber support portion 43f.

Upon satisfying the above equation, an incident angle α of the laser beam being out of the utmost end of optical fiber 1a is 90° or more even when the smallest, with respect to end face 43e.

Also, in the fifth embodiment as shown in FIG. 10, the laser beam incident on the end face 43e of the optical fiber support portion 43f is reflected toward the inner periphery of sleeve 43 facing the gap 43c, thereby avoiding the inconvenience of fusing the optical fiber 1a.

In addition, the sleeve 43 in this embodiment, when formed of the fine ceramics, is easy to mold integrally as in the same manner as the fourth embodiment.

Alternatively, sleeve 43 in the fourth embodiment may be formed itself only of copper in the same manner as the conventional one and may be coated on the inner periphery facing the front gap 43c with a high heat resistant inorganic substance, or a cylinder thereof may be fitted into the sleeve 43.

Figure 11:
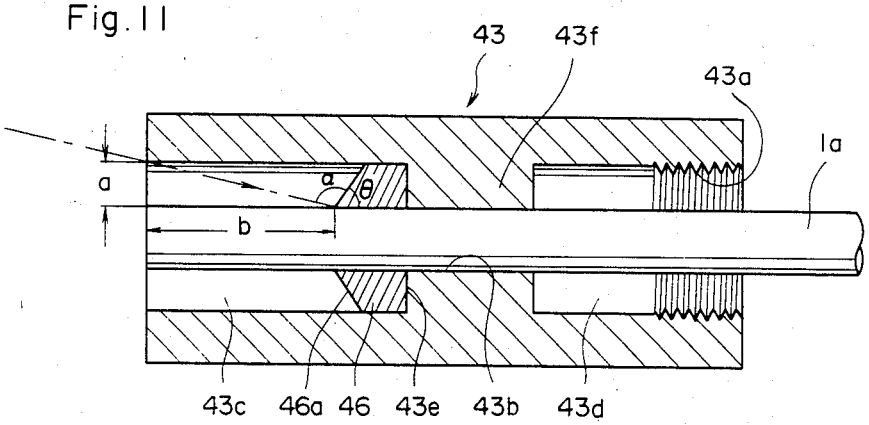

FIG. 11 is a sectional side view of sleeve 43 representing a sixth embodiment of the invention. In this embodiment, sleeve 43, as a whole, including the optical fiber support portion 43f is formed of copper in the same manner as the conventional one and provided at the fore end face of the optical fiber support portion 43f with a chip 46 formed of the high heat resistant inorganic substances shown in Tables 1 and 2, the chip 46 being formed in a cylindrical shape of an inner diameter about equal to a diameter of optical fiber 1a and insertably fixed in the front gap 43c in condition of abutting against the end face 43e of the optical fiber support portion 43f.

Also, chip 46, in the same manner as the fifth embodiment (refer to FIG. 10), is tapered like a truncated cone whose diameter at the end side face of the optical fiber 1a is smallest, thereby forming an inclined surface 46a (at an angle θ). The angle θ of inclination, when formed to satisfy the same condition as that in described fifth embodiment, will demonstrate the same effect as described above.

Figure 12:
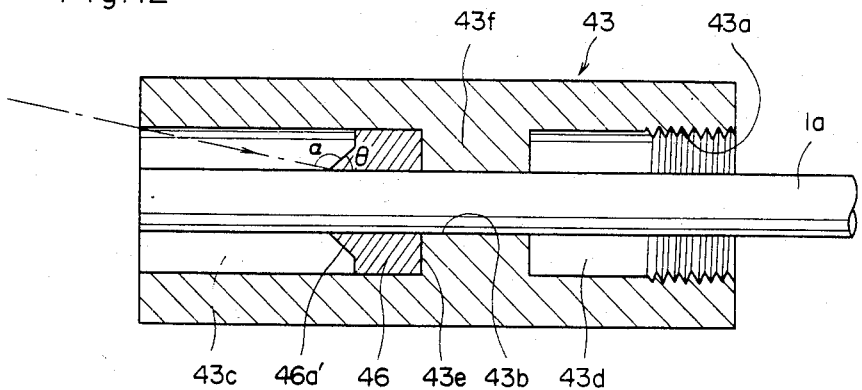

FIG. 12 is a sectional side view of sleeve 43 in a seventh embodiment of the invention, which is the same in basic construction as the sixth embodiment in FIG. 11, but differs therefrom in that chip 46 is not tapered at the overall end face at the front side, but only at about a half of the front end face to thereby form an inclined surface 46a' at an angle θ of inclination. The angle θ of inclination of the tapered surface 46a', when set in the same condition as the fifth and sixth embodiments, will demonstrate about the same effect as the above embodiments.

In addition, it is, of course, possible in the sixth and seventh embodiments not to form the inclined surface 46a or 46a' at the front end face of the chip 46 of high heat resistant inorganic substance at the laser beam incident side.

Furthermore, in the sixth and seventh embodiments of the invention as shown in FIGS. 11 and 12, a plug having a sleeve set to be a: 0.75 mm, b: 3 mm and θ=76°, was mounted on the incident end of the step index type quartz series optical fiber of core diameter 400 μm and clad diameter having a 500 μm and radiated with the YAG laser beam of pulse width of 8 m s and output 20 J in several tens of thousands pulses, resulting in no breakage on the optical fiber.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A connector for a high energy beam, which is provided at the end of a large core diameter type optical fiber on which a high energy beam is to be incident, said optical fiber having an end face, wherein said connector includes a sleeve which is fitted on the end of said optical fiber which sleeve has an inner diameter and an outer diameter wherein said inner diameter includes a larger diameter portion which is larger than the diameter of said optical fiber so that a gap is formed between the inner periphery of the sleeve and the outer periphery of the optical fiber and in a desired axial length from the end face of said optical fiber, and an optical fiber support portion having an inner diameter about equal to the diameter of the optical fiber, at least said optical fiber support portion being formed from a heat resistant inorganic material having a melting point of at least about 1500° C., wherein said heat resistant inorganic material forming said optical fiber support portion at the sleeve is a transparent or translucent inorganic material having a refractive index of 1.452 or more and which transmits therethrough more than 5% of the quantity of incident light in a 1 mm transmission distance.

2. A connector for a high energy beam as set forth in claim 1, wherein said heat resistant inorganic material forming the optical fiber support portion at the sleeve is an opaque or a translucent inorganic material which does not transmit more than 5% of the quantity of incident light in a 1 mm transmission distance.

3. A connector for a high energy beam as set forth in claim 1, wherein an end face of the optical fiber support portion at the high energy beam outgoing side is roughened-surface-processed so as to make the high energy beam irregularly reflect from the end face.

4. A connector for a high energy beam as set forth in claim 1, wherein the larger diameter portion of said sleeve is formed at the inner peripheral surface of a heat resistant inorganic material having a melting point of at least about 1500° C.

5. A connector for a high energy beam as set forth in claim 1, wherein all of said sleeve including the optical fiber support portion is integrally formed of a heat resistant inorganic substance having a melting point of at least about 1500° C.

6. A connector for a high energy beam as set forth in claim 1, wherein the optical fiber support portion is tapered at an end face thereof facing said gap like a truncated cone whose diameter at the end face of the optical fiber is smallest.

7. A connector for a high energy beam as set forth in claim 6, wherein an angle θ of inclination of the tapered face satisfies the following equation:

$$\theta \leq 90° - \arctan(a/b),$$

wherein a is half the difference between the inner diameter of the sleeve and the diameter of the optical fiber, and b is the distance from the utmost end face of said sleeve to the end face of the optical fiber support portion.

8. A connector for a high energy beam as set forth in claim 1, 4, 5 or 6, wherein said heat resistant inorganic material is selected from a group of transparent or translucent inorganic substances consisting of sapphire ($Al_2O_3$), rutile ($TiO_2$), strontium titanate ($SrTiO_3$) and diamond (C).

9. A connector for a high energy beam as set forth in claim 1, wherein the heat resistant inorganic material is an oxide.

10. A connector for a high energy beam as set forth in claim 9, wherein the oxide is selected from the group consisting of $Al_2O_3$, $BaO$, $BeO$, $CaO$, $CeO_2$, $Cr_2O_3$, $CoO$, $Cb_2O_5$, $Ga_2O_3$, $HfO_2$, $La_2O_3$, $LiO_2$, $ThO_2$, $TiO_2$, $UO_2$, $ZrO_2.CaO.HFO_2$, $Ta_2O_5$, $V_2O_5$ and $SnO_2$.

11. A connector for a high energy beam as set forth in claim 1, wherein the heat resistant inorganic material is a silicate.

12. A connector for a high energy beam as set forth in claim 11, wherein the silicate is selected from the group consisting of $BaO.SiO_2$, $BaO.ZrO_2.SiO_2$, $2BeO.SiO_2$, $2CaO.SiO_2$, $2CaO.Al_2O_3.SiO_2$, $MgO.SiO_2$, $2MgO.SiO_2$, $ZnO.ZrO_2.SiO_2$, $ZrO_2.SiO_2$, $Al_2O_3.SiO_2$, and $BaO.Al_2O_3.SiO_2$.

13. A connector for a high energy beam as set forth in claim 1, wherein the heat resistant inorganic material is an aluminate.

14. A connector for a high energy beam as set forth in claim 13, wherein the aluminate is selected from the group consisting of $3CaO.5Al_2O_3$, $Li_2O.Al_2O_3$, $Na_2O.Al_2O_3$, $Ti_2O.Al_2O_3$, $3CaO.2Na_2O.5Al_2O_3$, $TiO_2.Al_2O_3$, and $CaO.Al_2O_3$.

15. A connector for a high energy beam as set forth in claim 1, wherein the heat resistant inorganic material is a titanate.

16. A connector for a high energy beam as set forth in claim 15, wherein the titanate is selected from the group consisting of $3BeO.TiO_2$, $CaO.TiO_2$, and $2MgO.TiO_2$.

17. A connector for a high energy beam as set forth in claim 1, wherein the heat resistant inorganic material is a nitride.

18. A connector for a high energy beam as set forth in claim 17, wherein the nitride is selected from the group consisting of $Ba_3N_2$, $BN$, $HfN$, $TaN$, $TiN$, $AlN$ and $Si_3N_4$.

19. A connector for a high energy beam as set forth in claim 1, wherein the heat resistant inorganic material is a boride.

20. A connector for a high energy beam as set forth in claim 19, wherein the boride is selected from the group consisting of $NB$ and $HfB$.

21. A connector for a high energy beam as set forth in claim 1, wherein the heat resistant inorganic material is a carbide.

22. A connector for a high energy beam as set forth in claim 21, wherein the carbide is selected from the group consisting of $CbC$, $HfC$, $TaC$, and $SiC$.

23. A connector for a high energy beam as set forth in claim 1, wherein the heat resistant inorganic material is a zirconate.

24. A connector for a high energy beam as set forth in claim 23, wherein the zirconate is selected from the group consisting of $ThO_2.ZrO_2$, $BaO.ZrO_2$, $CaO.ZrO_2$, and $MgO.ZrO_2$.

25. A connector for a high energy beam as set forth in claim 1, wherein the heat resistant inorganic material is a phosphate.

26. A connector for a high energy beam as set forth in claim 25, wherein the phosphate is selected form the group consisting of $AlPO_4$, $Ca_3(PO_4)_2$, $CaF_2.3CaP_2O_8$, and $5CaO.SiO_2.P_2O_5$.

27. A connector for a high energy beam as set forth in claim 1, wherein the heat resistant inorganic material is a spinel.

28. A connector for a high energy beam as set forth in claim 27, wherein the spinel is selected from the group consisting of $BaO.Al_2O_3$, $CaO.Al_2O_3$, $MgO.Al_2O_3$, $ZnO.Al_2O_3$, $MgO.Cr_2O_3$, $ZnO.Fe_2O_3$, and $Al_2O_3.MgO$.

* * * * *